Sept. 3, 1946.   R. B. DAY   2,406,810
TREATMENT OF HYDROCARBONACEOUS SOLIDS
Filed March 18, 1944
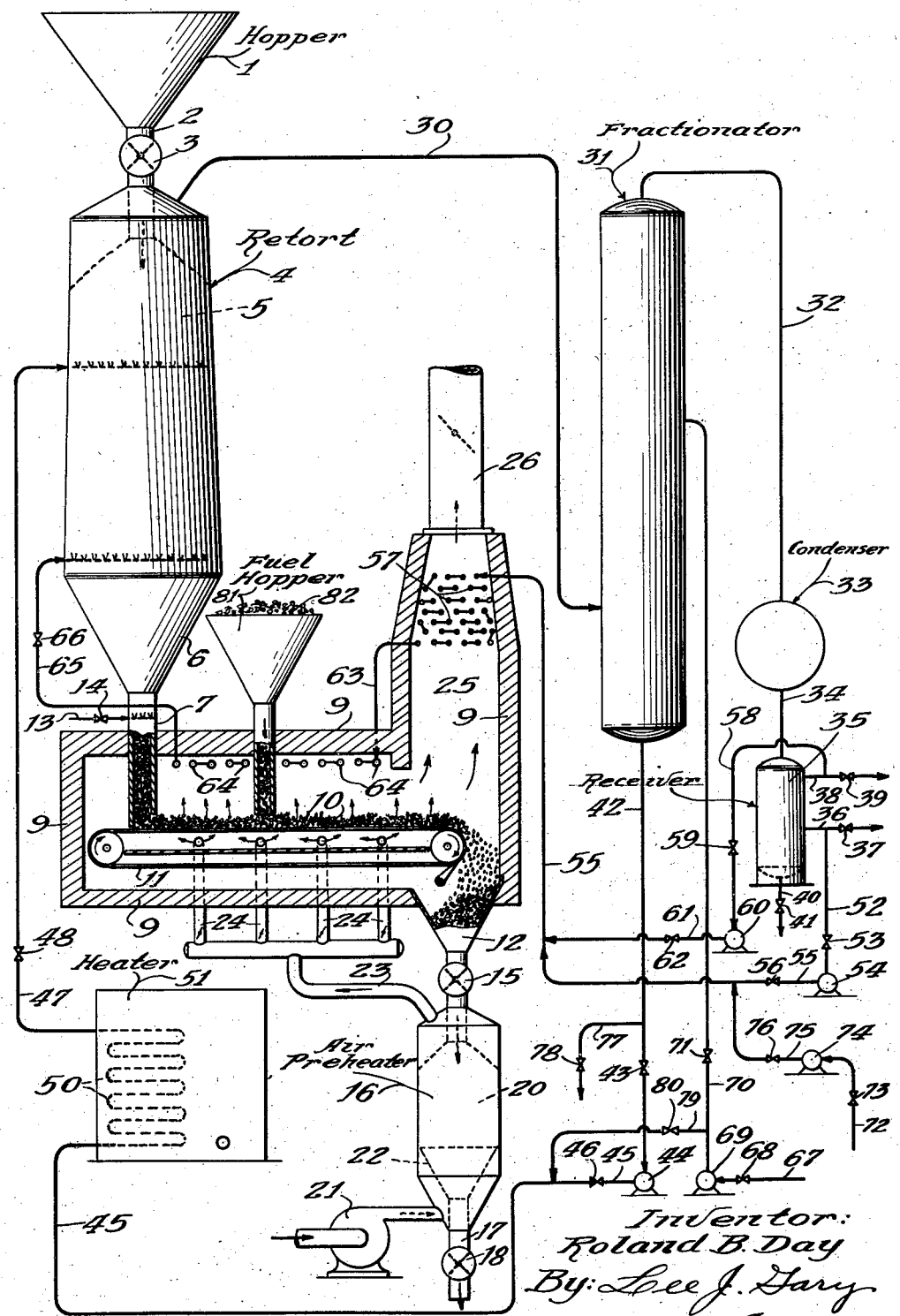
Inventor:
Roland B. Day
By: Lee J. Gary
Attorney:

Patented Sept. 3, 1946

2,406,810

UNITED STATES PATENT OFFICE 2,406,810

TREATMENT OF HYDROCARBONACEOUS SOLIDS

Roland B. Day, Riverside, Ill., assignor to Universal Oil Products Company, Chicago, Ill., a corporation of Delaware Application March 18, 1944, Serial No. 527,128

7 Claims. (Cl. 196—56)

The invention relates to an improved process and apparatus for the production of normally liquid and normally gaseous hydrocarbons, by distillation and pyrolytic conversion, from hydrocarbonaceous solids, such as, for example, oil shales, tar sands, coal, lignite and materials of a similar nature.

One of the primary objects of the invention is to provide a process and apparatus in which valuable normally liquid and gaseous hydrocarbons are recovered from hydrocarbonaceous solids without the formation of oxidation products from these valuable fractions and without commingling the fractions to be recovered with gaseous products of combustion or other inert gases which are difficult to separate from the hydrocarbon gases.

A further object of the invention is to effect the pyrolytic conversion of normally liquid or gaseous conversion products derived from the solid hydrocarbonaceous material and utilize resulting highly heated products of said pyrolytic conversion to effect the distillation of volatiles from the solid material.

A further object of the invention is to simultaneously effect the distillation of volatile hydrocarbons from hydrocarbonaceous solids and pyrolytically convert volatile fractions thus derived into more valuable products in such a manner that resulting heavy conversion products of the nature of coke and tar-like residue are deposited on the solid material from which said volatiles have been distilled and are removed therewith from the distilling retort. Carbonaceous and heavy pitch-like material carried by the solids from the distilling zone are burned therefrom in a separate combustion zone and heat thus evolved is utilized to heat relatively light volatile fractions previously evolved from the solid material. Resulting highly heated products are supplied to the distilling retort to assist the vaporization and pyrolytic conversion of heavier fractions in this zone. The invention further contemplates the passage of solids, from which remaining heavy combustibles have been burned as aforesaid, with the resulting storage of heat therein, in direct contact with air subsequently employed for supporting combustion of said residual carbonaceous and heavy hydrocarbonaceous material, whereby to preheat the air and effect further overall heat economy within the process.

One specific embodiment of the process provided by the invention involving the advantageous and cooperative combination of features above mentioned comprises maintaining a bed of the solid hydrocarbonaceous material to be treated in a confined distilling zone, continuously supplying said material in subdivided form to the upper portion of said bed, causing the particles or lumps of solid material comprising said bed to move continuously downwardly through the distilling zone, effecting substantial devolatilization of the solid material comprising said bed within the distilling zone by supplying heat thereto as subsequently described, removing the evolved volatile hydrocarbons from the distilling zone and separating the same into selected relatively light and relatively heavy liquid fractions and gases, heating said relatively heavy liquid fractions to a temperature suitable for their pyrolytic conversion and supplying the heated material to an intermediate point in said distilling zone and into direct contact with the upper portion of said bed therein to supply heat to the latter for said distilling operation, separately heating relatively light, normally liquid and/or gaseous fractions derived as aforesaid to a substantially higher temperature than that to which said heavy fractions are heated and introducing the highly heated material into the lower portion of said distilling zone and into direct contact with the bed therein to supply additional heat for further distillation of volatile fractions from the solid material, directing solid material from the lower portion of said bed in the distilling zone into a combustion zone and therein burning residual combustibles from the solid material, employing heat thus evolved in the combustion zone to heat said relatively light normally liquid and/or gaseous fractions to the desired high temperature prior to their introduction into the distilling zone, removing solid material from which said residual combustibles have been burned and in which a portion of the heat of combustion is stored from the combustion zone, passing the same in indirect contact with air to preheat the latter and cool the solid material, discharging the thus cooled solid material from the system and supplying air thus preheated to the combustion zone to effect the burning of said residual combustibles from the solid material therein.

The above mentioned and other features and advantages of the process and apparatus provided by the invention will be further described and explained with reference to the accompanying diagrammatic drawing.

The solid charging material for the process may comprise oil shale, coal or other bituminous or semi-bituminous solid material from which the desired volatiles may be derived by distillation and/or cracking. Oil shales and so-called tar sands are particularly suitable. In the case of shale, coal and the like, the solid material is preferably supplied to the distilling retort in the form of relatively large pieces having a maximum dimension, for example, of two to three inches. The process does not necessitate fine grinding or pulverization of the solid material and thus results in saving the cost of such an operation. However, a considerable amount of fines may, when desired, be fed to the retort with the larger pieces and excessively large pieces may be passed through a crushing and screening operation. With some charging materials, such as shales and tar sands, it is also desirable to remove excess moisture therefrom before the material is supplied to the distilling retort. The crushing, grinding and dehydrating or moisture-reducing operations may be accomplished in any conventional equipment of suitable form, not illustrated in the drawing.

Referring now to the drawing, after any required pretreatment, such as above mentioned, the solid charging material is fed by a suitable elevator or the like not shown to hopper 1 from which it passes downwardly through conduit 2 and a suitable sealing and flow-regulating device, such as, for example, the star feeder indicated at 3, into retort 4 and into the bed 5 of solid material maintained within the retort.

The distilling retort 5 is a vertically elongated vessel preferably having an outer metal wall or casing and lined with suitable high temperature refractory material not illustrated. The retort is preferably constructed with a gradually increasing internal diameter from its upper to its lower portion so as to accommodate some swelling of the bed of solid material undergoing distillation without sticking and plugging of the retort. The solid particles of the bed 5 pass continually downwardly through the retort and a large portion of their volatile components is driven off by the direct application of heat thereto as they pass through the bed. This is accomplished by introducing highly heated hydrocarbons, as will be later described, into the retort and into direct contact with the solid particles of the bed.

The temperature employed in the distilling retort is preferably within the range which will give pyrolytic conversion or cracking of a considerable portion of the volatiles driven therefrom and the temperature maintained in the lower portion of the bed 5 in the retort is sufficiently high to cause substantial coking of any residual tar-like materials remaining on the solid particles, including those formed and deposited thereon as a result of the preceding distilling and cracking operation. Thus, the solid particles of the bed leaving the distilling zone will carry a substantial quantity of residual combustibles of the nature of petroleum coke or the like. These residual combustibles represent the least valuable components of the hydrocarbonaceous materials originally contained in the charge and formed in the cracking operation. In the present process all or a substantial portion of these residual combustibles are burned from the remaining incombustible solid material subsequent to their discharge from the distilling retort, as will now be described.

The solid particles from which all or a substantial portion of the volatiles have been driven in the distilling, cracking and coking operation are directed in the case illustrated through the hopper-like bottom section 6 of the retort onto a moving grate or conveyer 11 disposed within a combustion zone defined by refractory walls 9. The solid material is distributed on the moving grate or conveyer in the form of a relatively thin bed 10 which moves continuously away from the point at which the solid material is supplied thereto to the opposite discharge end of the combustion zone where it falls into the discharge hopper 12 to pass therefrom, preferably through a suitable cooling zone and from the system, as will be later described.

The length and speed of the chain grate or conveyer 11 are correlated to give sufficient time for the solid material in the combustion zone to burn all of a major portion of the residual combustibles therefrom while keeping a relatively thin bed 10 on the grate. Air is admitted, as will be later described, to the combustion zone, preferably at spaced points along and beneath the moving grate and passes upwardly through the latter into contact with the bed 10 wherein it supports combustion of the residual carbon and heavy hydrocarbonaceous material carried from the distilling retort by the solid particles. The temperature attained in the combustion zone may be kept at the desired value by regulation of the amount of air supplied thereto, a relatively large amount of excess air being ordinarily employed to dilute and cool the evolved combustion gases. The gaseous products of combustion are discharged from the combustion zone through a heating chamber 25 to a suitable stack 26.

To prevent any substantial passage of combustion gases from the combustion zone into the distilling retort 4, steam or any other suitable relatively inert gas is supplied as a blanketing and stripping medium to the hopper bottom 6 of the retort or into the conduit 7 which connects this portion with the combustion zone. Line 13 and valve 14 is provided for this purpose in the case illustrated and a portion of the steam thus introduced into contact with the solid material passing from the distilling retort passes therewith into the combustion zone, while another portion passes upwardly into the distilling retort and displaces or substantially strips occluded volatile hydrocarbons from the solid material so that no substantial quantity of the latter pass into the combustion zone. To substantially seal the opposite end of the combustion zone and prevent the escape of any substantial quantity of combustion gases with the solid particles being discharged therein, a suitable sealing device, such as, for example, the star feeder indicated at 15 is provided at the discharge end of hopper 12.

The hot solid particles from which all or a substantial portion of the residual combustibles have been burned in the combustion zone are directed from the latter through hopper 12 and member 15 to a separate confined vessel 16 which, in the case illustrated, serves as an air preheater, wherein the solid material is cooled, as will be later described, by direct contact with air and is thence discharged through conduit 17 and a sealing and flow-regulating device, such as the star feeder 18, to suitable conveying means, such as a dump car or the like not shown. A downwardly moving bed 20 of the solid particles is maintained within vessel 16 and air is supplied by a suitable blower or the like indicated at 21 to the lower portion of vessel 16 beneath a suitable substantially cone-shaped perforate member or the like indicated at 22, through which it passes into the bed 20 and is there heated by direct contact with the hot solid material. The preheated air is directed from above the bed in vessel 16 through conduit 23 and preferably through a plurality of suitable branch conduits 24 into the combustion zone beneath bed 10 wherein it is used to support combustion and control the temperature in the combustion zone.

Vapors and gases supplied to and evolved in the distilling retort are directed from the upper portion thereof above bed 5 through line 30 to fractionator 31 wherein their high-boiling normally liquid components are condensed and from the upper portion of which fractionated vapors and gases of the desired end-boiling point are directed through line 32 to condenser 33. The resulting condensate and uncondensed normally gaseous fractions are supplied from the condenser through line 34 to the receiver and gas separator 35, wherefrom the distillate product may be withdrawn to storage or to any desired further treatment through line 36 and valve 37 and wherefrom the normally gaseous fractions are directed through line 38 and valve 39 to storage or to suitable fractionating and gas concentrating equipment not illustrated. Steam supplied to the distilling retort and that formed by the vaporization of moisture in the solid charging material charged to the retort is condensed in condenser 33 and the water which separates from the distillate in receiver 35 is withdrawn therefrom through line 40 and valve 41.

Any desired conventional method of providing refluxing liquid in fractionator 31 and controlling the top temperature of the fractionator may be employed within the scope of the invention. For example, regulated quantities of the distillate collected in receiver 35 may be returned by well known means, not illustrated, to the upper portion of the fractionator to serve as a cooling and refluxing medium in this zone.

Relatively high-boiling liquid fractions condensed from the vapors in fractionator 31 are collected as reflux condensate or bottoms in the lower portion of the fractionator and are directed, all or in part, therefrom through line 42 and valve 43 to pump 44 by means of which they are fed via line 45 and valve 46 to and through a suitable heating coil 50 disposed within a suitable furnace structure 51 and are therein heated to a cracking temperature which is preferably within the approximate range of 800 to 950° F. The resulting heated products are directed from heating coil 45 through line 47 and valve 48 into the distilling retort at one or a plurality of intermediate points in bed 5 where the heated products directly contact and supply heat to the solid particles of the bed to vaporize and drive off volatiles from the solid material.

Appreciable cracking of the heated heavy oil from coil 45 will occur within the distilling retort with concomitant cracking of volatile fractions of the solid material with which the heated heavy oil is commingled in the retort. The vaporization and cracking effected in the upper portion of bed 5 will leave a considerable quantity of relatively heavy liquid or semi-liquid fractions on the solid material passing therefrom to the lower portion of bed 5. These heavy fractions may be advantageously cracked and reduced to substantially dry coke-like material by their further heating to a considerably higher temperature in the lower portion of bed 5. This is accomplished in the present process by recycling relatively low boiling normally liquid and/or normally gaseous products to the lower portion of the retort after they have been heated to the required high temperature, as will now be described.

Regulated quantities of the distillate collected in receiver 35 may be directed through line 52 and valve 53 to pump 54 and supplied therefrom through line 55 and valve 56 to heating coil 57. Alternatively, or in addition, regulated quantities of the gas collected in receiver 35 may be directed through line 58 and valve 59 to compressor 60 and fed therefrom through line 61, valve 62 and line 55 to heater 57. In heater 57 the distillate and/or gas supplied thereto is heated to a relatively mild temperature by heat recovered from the combustion gases passing over coil 57 from the previously described combustion zone, coil 57 being located within the previously mentioned heating zone 25. The heated materials are directed from coil 57 through line 63 to a bank of tubular fluid conduits 64 which, in the case here illustrated, are disposed adjacent the roof of the said combustion zone and above the bed 10 in this zone. Each fluid conduit receives direct radiant heat from the relatively hot bed 10 and receives reflected radiant heat from the refractory roof 9. The hydrocarbons supplied to the tube bank 64 are thus rapidly heated to a high temperature which is preferably within the approximate range of 950 to 1200° F. and the highly heated products are discharged through line 65 and valve 66 into the lower portion of the distilling retort and into direct contact with bed 5 to pass upwardly therethrough and effect further distillation, cracking and coking within the bed.

The invention contemplates the use of hydrocarbon oil and/or gas from an external source in starting and operation and, when desired, such material may be continuously supplied to the process. For example, relatively heavy oil or oil of relatively wide boiling range such as crude petroleum, topped crude, gas oil and the like may be supplied through line 67 and valve 68 to pump 69 and fed therefrom through line 70 and valve 71 to fractionator 31. When thus supplied to the system it commingles in the fractionator with vapors from the retort and is subjected to fractionation therewith and at least in part to subsequent cracking treatment in the heavy oil heating coil. Alternatively, relatively heavy oil may be supplied directly from pump 69 to the heavy oil heating coil via line 79, valve 80 and line 45.

When relatively light oil or gas from an external source is employed it may be supplied through line 72 and valve 73 to pump 74 and thence fed through line 75, valve 76 and line 55 to heating coils 57 and 64, to be therein heated to a relatively high cracking temperature and supplied, as previously described, to a relatively low point in the retort. When relatively light oil is thus utilized it may comprise, for example, straight-run gasoline or naphtha fractions, kerosene, kerosene distillate, light gas oil or the like. When gas from an external source is supplied to coils 57 and 64 it may comprise natural gas or selected fractions thereof or any other available normally gaseous hydrocarbons including such materials as ethane, methane, propane, butane and the corresponding olefins, propylene and butylene.

It is also within the scope of the invention to recover selected normally liquid fractions formed in fractionator 31 as final products of the process. Line 77 and valve 78 communicating with line 42 are provided in the case illustrated for recovering any desired quantity of the fractionator bottoms. Selected lighter fractions may be removed when desired by well known means not illustrated from suitable higher points in fractionator 31.

In case the coke-like residual combustibles remaining in the solid materials discharged from the retort are of insufficient quantity to furnish the total heat desired in the combustion zone and the heating zone 25, I contemplate supplying additional fuel to bed 10. A hopper 81 is provided from which fresh oil shale, coal, tar sand or other solid fuel indicated at 82 may be fed with the solid material from the retort to bed 10 on the moving grate 11.

The temperature employed in a distilling and cracking retort preferably ranges from a temperature of 750 to 850° F. or thereabouts in the upper portion of the bed, to a considerably higher temperature of the order of 900 to 1100° F. in the lower portion of the bed. The retort is preferably operated at substantially atmospheric or relatively low superatmospheric pressure. As previously indicated the temperature employed at the outlet of the heavy oil heating coil may range from 800 to 950° F. and preferably a substantially superatmospheric pressure of the order of 100 to 500 pounds gauge is employed at this point in the system. The temperature of the oil vapors and/or gases leaving heating coil 64 may range, for example, from 950 to 1200° F. and the pressure employed at this point in the system may range from substantially atmospheric to a high superatmospheric pressure of as much as 1,000 pounds gauge.

I claim as my invention:

1. The method of distilling volatile hydrocarbons from hydrocarbonaceous solids which comprises passing the solid material in subdivided state and in the form of a bed downwardly through an externally unheated distilling retort, therein effecting the evolution of volatiles from the bed and leaving a combustible heavy residue in the solid material discharged from the bed and retort, burning combustibles from the solid material discharged from the retort and preventing admixture of the resultant combustion gases with the vapors evolved in the retort, passing hydrocarbon fluid in indirect heat exchange with hot combustion gases produced by said burning step to heat said fluid to a high temperature and introducing the heated fluid into the distilling retort and into direct contact with said bed therein to supply heat to the latter for effecting the evolution of volatiles from the said solid material.

2. The process defined in claim 1 further characterized in that the burning of residual combustibles from the solids discharged from the retort is accomplished by passing a relatively shallow moving bed of the solid material through a combustion zone and supplying air to the bed, and wherein said hydrocarbon fluid is heated to said high temperature while being passed through a tubular fluid conduit exposed to direct radiation from the last named bed.

3. The process defined in claim 1 further characterized in that substantially incombustible solids from which said residual combustibles have been burned are cooled by passing the same in direct contact with air and resulting preheated air is employed to effect said burning of the residual combustibles in the solid material discharged from the retort.

4. The process of claim 1 wherein said hydrocarbon fluid comprises normally gaseous hydrocarbons.

5. The process of claim 1 wherein said hydrocarbon fluid comprises normally liquid hydrocarbons.

6. The process of claim 1 wherein said hydrocarbon fluid comprises a mixture of normally liquid and normally gaseous hydrocarbons.

7. The method of producing valuable normally liquid hydrocarbons and hydrocarbon gases from hydrocarbonaceous solids which comprises maintaining a bed of the latter in subdivided form in a distilling retort, supplying heat internally to said retort and to said bed, in the manner hereinafter defined, to effect the evolution of volatile hydrocarbons from the solid material and effect the cracking of relatively heavy volatiles therein, continuously supplying said solid material to the upper portion of the bed and continuously removing from its lower portion and from the retort residual non-volatile components of the solid material, including coke-like material and non-combustibles, burning combustibles subsequent to their discharge from the retort and preventing admixture of the resultant combustion gases with the vapors evolved in the retort, removing vaporous and gaseous products of the distilling and cracking operation from the retort, fractionating the same to separate selected relatively light and heavy components thereof, heating at least one selected fraction of the resulting products to cracking temperature by passing the same in indirect heat exchange with hot combustion gases produced by the aforesaid burning step, and introducing the thus heated fraction to the retort and into direct contact with said bed to furnish heat for said distillation and cracking within the retort.

ROLAND B. DAY.